(12) United States Patent
Kanauchi (10) Patent No.: US 6,193,329 B1
(45) Date of Patent: Feb. 27, 2001

(54) BRAKING DEVICE

(75) Inventor: Koji Kanauchi, Kawasaki (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/202,287

(22) PCT Filed: Apr. 23, 1998

(86) PCT No.: PCT/JP98/01867

§ 371 Date: Dec. 11, 1998

§ 102(e) Date: Dec. 11, 1998

(87) PCT Pub. No.: WO98/49040

PCT Pub. Date: Nov. 5, 1998

(30) Foreign Application Priority Data

Apr. 25, 1997 (JP) .................................................. 9-108602

(51) Int. Cl.[7] ............................. F04B 39/00; F04B 53/22
(52) U.S. Cl. ......................... 303/116.4; 303/10; 417/363
(58) Field of Search ................... 303/10, 115.5, 303/116.1, 116.4; 417/322, 360, 363

(56) References Cited

U.S. PATENT DOCUMENTS

| | | | |
|---|---|---|---|
| 5,531,573 | * 7/1996 | Nokubo | 417/360 |
| 5,634,695 | * 6/1997 | Ohta et al. | 303/10 |
| 5,697,678 | * 12/1997 | Huber | 303/116.4 |
| 5,704,694 | * 1/1998 | Kozakai | 303/113.2 |
| 5,820,229 | * 10/1998 | Pueschel | 303/139 |
| 5,842,752 | * 12/1998 | Sekiguchi | 303/116.4 |

FOREIGN PATENT DOCUMENTS 2231253  9/1990 (JP) .

* cited by examiner

*Primary Examiner*—Chris Schwartz
(74) *Attorney, Agent, or Firm*—Foley & Lardner

(57) ABSTRACT

A motor is secured to a housing by securing bolts. These bolts are threaded into screw-threaded holes formed in the housing so as to be parallel to an axis of rotation of a motor driven shaft, which drives radially reciprocal plungers that are disposed in diametrically opposed pump bores located on either side of the shaft. The screw-threaded holes are arranged close to, but offset from, the pump bores so that extrapolations of the screw-threaded holes do not intersect the pump bores or cavities in which pressure pulsation dampers or reservoirs are defined, enabling the housing to be small and low in vibration and noise.

11 Claims, 6 Drawing Sheets

BRAKING DEVICE

TECHNICAL FIELD

The present invention relates to a brake system which is applied to an anti-brake skid control (which will be hereinafter referred to as a "ABS control"), and is capable of controlling a traction of road wheels and a yawing rate of an automotive vehicle, and particularly to a brake system having a motor-driven pump.

BACKGROUND ART

Conventionally, it is well known that a brake system which performs an ABS control, is employed with a fluid-pressure control valve capable of reducing, holding, and building up the wheel-brake cylinder pressure, a pump provided for sucking brake fluid drained into the reservoir during the pressure-reduction operation of the fluid-pressure control valve and for discharging the sucked brake fluid toward the upstream side of the fluid-pressure control valve, a damper device provided for dampening pulsation in the brake fluid discharged from the pump, and a motor provided for driving the above-mentioned pump.

One such brake system has been disclosed in Japanese Patent Provisional Publication No. 2-231253.

In the conventional brake system, a plunger, constructing a pump, is slidably accommodated in the housing so that the plunger is arranged in a direction perpendicular to the rotational axis of the motor. A damper and a reservoir are disposed in the housing. A motor is mounted on one side wall of the housing. As regards the structure of installation of the motor on the housing, mounting bolts are arranged parallel to the rotational axis of the motor in the direction perpendicular to the axial direction of the plunger. These mounting bolts are screw-threaded into the corresponding female screw holes opening at the side wall of the housing.

Now then, in recent years, it is desired to small-size and to lighten an unit for an ABS control from the viewpoint of easy mounting of the system on the automotive vehicle. The small-sizing and lightening would be achieved by planning an optimal lay-out of a plunger pump, a damper, a reservoir, and a fluid-pressure control valve, all disposed in the housing of the ABS unit.

On the other hand, in designing for a damper and a reservoir, a volumetric capacity necessary for the damper and a volumetric capacity necessary for the reservoir must be selected, accounting for an enhanced dampening effect with respect to the brake fluid pressure and for an enhanced pressure-reduction effect with respect to the brake fluid pressure. Thus, as a matter of course, the degree of the small-sizing of the damper and the reservoir is limited. As a measure of small-sizing the damper and the reservoir, these elements are located closer to each other in the housing, to enable reduction in the total size of the housing. In this case, it is necessary to prevent the position of each of screw-threaded holes for mounting bolts which are used to mount the motor on the housing from overlapping the installation position of the damper and the installation position of the reservoir. On the other hand, it is also necessary to provide a totally-balanced fastening force at the respective fixed points by properly arranging each mounting device containing a bolt and the corresponding female screw-threaded portion. It is difficult to optimally form screw holes in the housing, while satisfying all of the previously-noted necessary conditions.

Additionally, when the pump motor is driven during the operation of the previously-described plunger pump, the reaction force to the fluid pressure acts in the axial direction of the pump (or the axial direction of the plunger) on the compression stroke of the plunger. Furthermore, the reaction force transmits from the plunger to the rotational axis of the motor and acts in the direction perpendicular to the rotational axis. As a result of this, the rotational axis of the motor oscillates. There is an increased tendency for the system to vibrate. This produces noise in the system. In such a case, the greater the perpendicular distance of the fixed point of the mounting bolt mounting the motor on the housing with respect to the axial line of the pump (the axial line of the plunger), the smaller the rigidity of supporting the motor. It is disadvantageous to noise and vibrations.

Assuming that the fixed point of the motor is aligned with the axial line of the plunger, the rigidity of supporting the motor can be enhanced. It is advantageous to reduction in noise and vibrations. However, the screw holes threadably receiving the mounting bolts and the cylindrical bore accommodating therein the plunger are arranged in the direction of the rotational axis of the motor. Therefore, it is necessary to provide a housing size enough to form the screw hole in a space between the side wall of the housing and the cylindrical bore accommodating therein the plunger. There is a problem that the housing is large-sized.

It is, therefore, in view of the previously-described disadvantages of the prior art, an object of the present invention to provide a brake system which is capable of small-sizing the total size of the system and simultaneously reducing noise and vibrations, by disposing the fixed point of each of mounting bolts capable of mounting a motor on a housing at an optimal position, considering the lay-out of a damper and a reservoir arranged in the housing, in order to ensure a necessary volumetric capacity the damper and a necessary volumetric capacity of the reservoir.

DISCLOSURE OF THE INVENTION

The brake system of the present invention comprises a fluid-pressure generating means provided for generating a brake-fluid pressure depending on a driver's braking action, a brake actuating section connected through a brake circuit to the fluid-pressure generating means for applying a braking force to a road wheel, a fluid-pressure control means disposed in a middle of the brake circuit for reducing, holding, and building up the brake-fluid pressure of brake fluid in the braking-force actuating section, a reservoir disposed in a drain circuit into which the brake fluid is exhausted by the fluid-pressure control means during a pressure-reduction operating mode, a pump sucking the brake fluid in the reservoir and discharging the sucked brake fluid within toward the fluid-pressure generating means rather than the fluid-pressure control means of the brake circuit, a motor being a driving source of the pump, a motor shaft inserted into an inboard drive-shaft hole formed in a housing, and formed on an outer periphery thereof with a cam profile, pump bores constructing part of the pump and arranged symmetrically on a same axial line perpendicular to the motor shaft in a manner so as to sandwich the cam profile therebetween, plungers whose ends are in abutted-engagement with the cam profile, and the plungers respectively accommodated in the pump bores so that the plungers reciprocate according to rotation of the motor shaft, the motor being fixed to an end face of the housing by screwing mounting bolts into screw-threaded holes formed in the housing, and the screw-threaded holes being arranged substantially parrallelly in an axial direction of the motor shaft, and formed in a direction substantially perpendicular to an axis of the pump bore, wherein the screw-threaded holes are located at positions close to the pump bore to such an extent that the screw-threaded holes and the pump bore do not overlap each other when the pump bore is projected in axial directions of the screw-threaded holes.

Therefore, when the motor rotates, the plungers reciprocate in a direction perpendicular to the motor shaft, for sucking the brake fluid in the reservoir and for discharging the brake fluid into the brake circuit. At this time, reaction forces of the fluid pressure act on the plungers, such that the reaction forces are input in the direction perpendicular to the motor shaft. Then, the reaction forces input to the motor shaft are supported by means of the mounting bolts. Under this condition, since the mounting bolts and the screw-threaded holes are arranged to be sufficiently close to the pump bore to such an extent that the mounting bolts and the screw-threaded holes do not overlap with the pump bore in their projected directions, a high supporting rigidity can be obtained in comparison with a case where the mounting bolts and the screw-threaded holes are provided apart from the pump bore.

In addition, the screw-threaded holes are arranged at positions where the screw-threaded holes do not overlap with respect to the axis of the pump bore in the projected directions. Thus, in comparison with a case where the screw-threaded holes are arranged to overlap with the pump bore, the thickness measured from the end face of the housing to the pump bore can be reduced, thus small-sizing the dimension of the housing.

According to another aspect of the invention, a brake system comprises a fluid-pressure generating means for generating a brake fluid pressure depending on a driver's braking action, a brake actuating section connected to the fluid-pressure generating means through a brake circuit, for applying a braking force to a road wheel, a fluid-pressure control means disposed in a middle of the brake circuit, for reducing, holding, and building up the brake-fluid pressure of brake fluid in the braking-force actuating section, a reservoir disposed in a drain circuit into which the brake fluid is exhausted by the fluid-pressure control means during a pressure-reduction operating mode, a pump sucking the brake fluid in the reservoir and discharging the sucked brake fluid within toward the fluid-pressure generating means rather than the fluid-pressure control means of the brake circuit, a motor being a driving source of the pump, a motor shaft inserted into an inboard drive-shaft hole formed in a housing, and formed on an outer periphery thereof with a cam profile, pump bores constructing part of the pump and arranged symmetrically on a same axial line perpendicular to the motor shaft in a manner so as to sandwich the cam profile therebetween, plungers whose ends are in abutted-engagement with the cam profile, and the plungers respectively accommodated in the pump bores so that the plungers reciprocate according to rotation of the motor shaft, the motor being fixed to an end face of the housing by screwing mounting bolts into screw-threaded holes formed in the housing, and the screw-threaded holes being arranged substantially parrallelly in an axial direction of said motor shaft, and formed in a direction substantially perpendicular to an axis of the pump bore, wherein the screw-threaded holes are located at positions close to a reservoir hole for the reservoir to such an extent that the screw-threaded holes and the reservoir hole do not overlap each other when the reservoir hole is projected in axial directions of the screw-threaded holes.

Therefore, this case just discussed above can produce the same operation and effects as the previously-described case where the pump bore is regarded as the object limiting the layout of the screw-threaded holes. Alternatively, the same effects can be obtained in case that, in addition to the pump bore and/or the reservoir hole, the damper hole may be regarded as the object limiting the layout of the screw-threaded screws.

Furthermore, the invention is characterized in that the mounting bolts are secured to two points being point-symmetrical with respect to a center of axis of rotation of the motor shaft, and the screw-threaded holes formed at the two points being point-symmetrical with respect to the center of axis of rotation, and that the screw-threaded holes are arranged so that a line connecting axes of the mounting bolts and a line connecting axes of the screw-threaded holes are inclined by a predetermined angle with respect to an axial line of the pump bore.

Since the mounting bolts and the screw-threaded holes are respectively arranged to be point-symmetrical with respect to the axis of the motor shaft, as set forth above, when the reaction force of the fluid pressure is input into the motor shaft in the direction perpendicular to the axis thereof, the moment about the fixed point is scarcely produced, and whereby a high supporting rigidity can be obtained. Also, the system of the invention is characterized in that the previously-noted predetermined angle is 20°. The mounting bolts and the screw-threaded holes are arranged so that an angle between the line connecting the mounting bolts or the screw-threaded holes and the axial line of the pump bore is 20°, and thus the moment about the fixed point is scarcely produced, thereby ensuring a high supporting rigidity.

Moreover, the invention is characterized in that the plungers comprise two plungers disposed in the housing and the pump bores comprise two pump bores disposed in the housing, and that a first reservoir and a first damper, both associated with a first plunger of the plungers, are provided in the housing, and a second reservoir and a second damper, both associated with a second plunger of the plungers, are provided in the housing, both of the reservoirs are disposed in first and second reservoir holes and both of the dampers are disposed in first and second damper holes, the first and second reservoir holes and the first and second damper holes being bored from a face perpendicular to all a face of the housing onto which the motor is fixedly connected and faces through which the pump bores open, and bored in a direction perpendicular to both the axis of the pump bore and the motor shaft, and that the two reservoir holes and the two damper holes are arranged so that a line connecting axes of the reservoir holes and a line connecting the damper holes do not overlap each other, and that one of the damper holes is arranged at a position where the one of the damper holes overlaps the pump bore when the pump bore is projected in an axial direction of the one of the damper holes, and that, when viewing the two screw-threaded holes from the face onto which the motor is mounted, one of the screw-threaded holes is arranged in the opposite side of the first damper hole overlapping the pump bore in a projected direction, while sandwiching the pump bore in cooperation with the one of the screw-threaded holes, whereas another screw-threaded hole of the two screw-threaded holes is disposed between the pump bore and the second damper hole, and that the diameters of openings of both of the damper holes are formed to be identical to each other, an axial dimension of the second damper hole is formed to be shorter than an axial dimension of the first damper hole, and that the second damper hole is formed, at a side wall thereof with an enlarged portion provided to enlarge a volumetric capacity of the second damper hole in a diametrical direction, so that the volumetric capacities of both of the damper holes are substantially identical to each other.

Therefore, in this invention, in forming one of the two screw-threaded holes between the pump bore and the second damper hole, and in ensuring a space necessary to form this screw-threaded hole, the axial dimension of the second damper hole is shortened and additionally diametrically-enlarged portions are formed in the second damper hole so that the volumetric capacity of the second damper hole is substantially identical to the volumetric capacity of the first damper hole, and whereby the damper performance can be ensured.

DESCRIPTION OF THE PREFERRED EMBODIMENTS

Hereunder, the embodiments made according to the invention is described in detail by reference to the attached drawings.

First Embodiment

Figure 1:
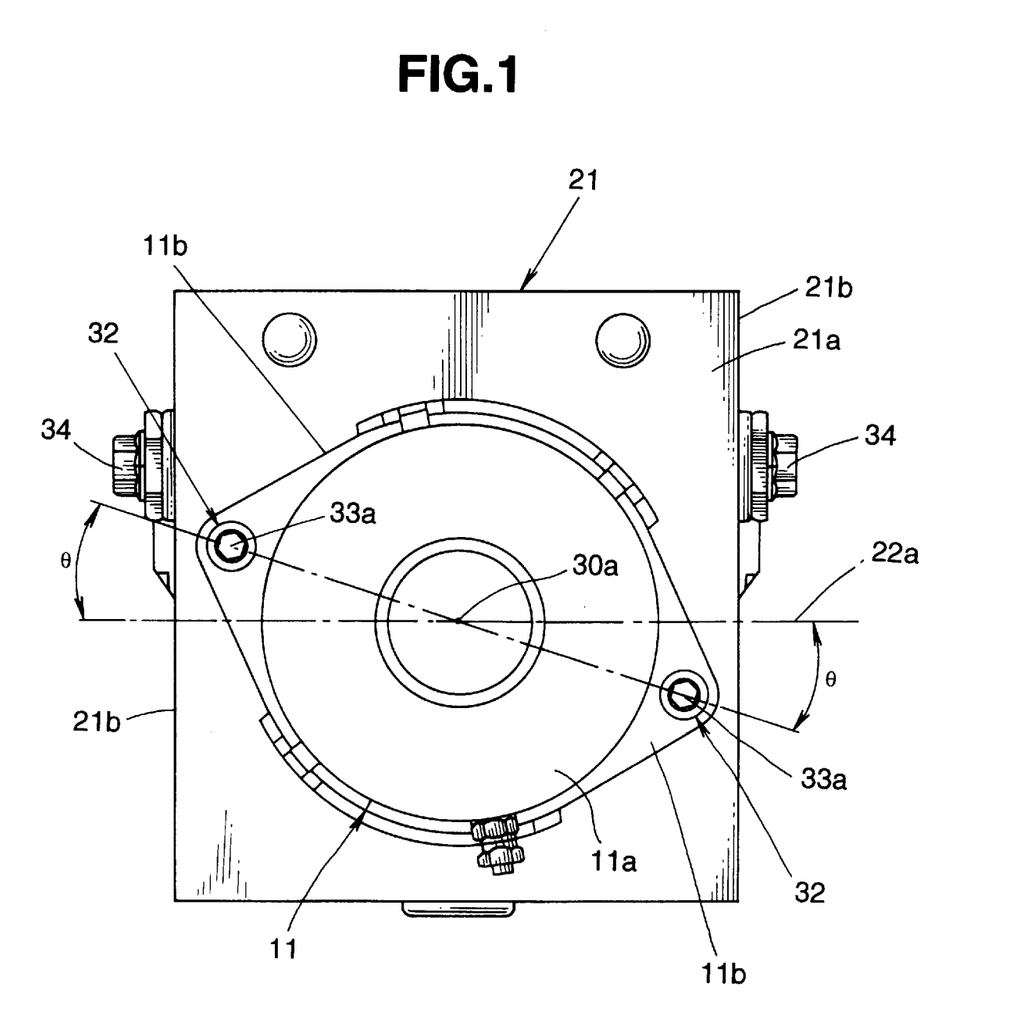
FIG. 1 is a front view illustrating a first embodiment of a brake unit employed in a brake system made according to the present invention.
Figure 2:
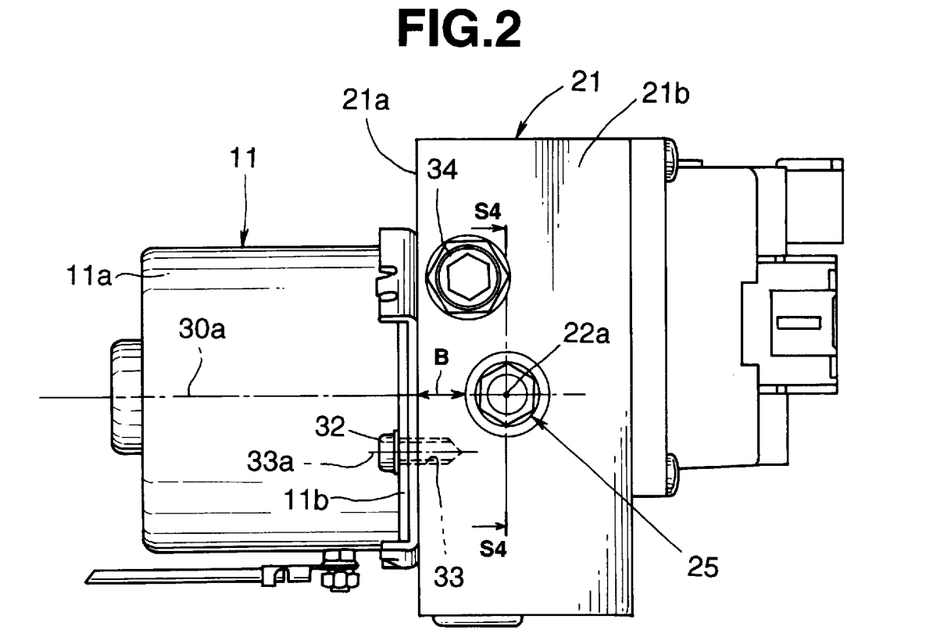
FIG. 2 is a side view illustrating the previously-noted brake unit.
Figure 3:
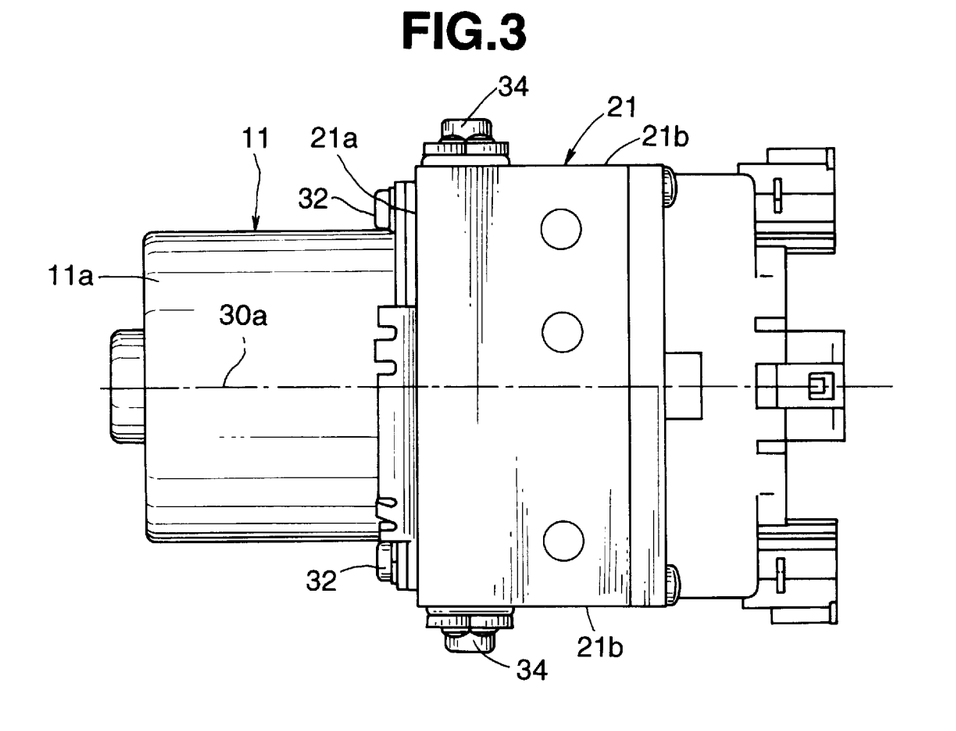
FIG. 3 is a plan view illustrating the previously-noted brake unit.
Figure 4:
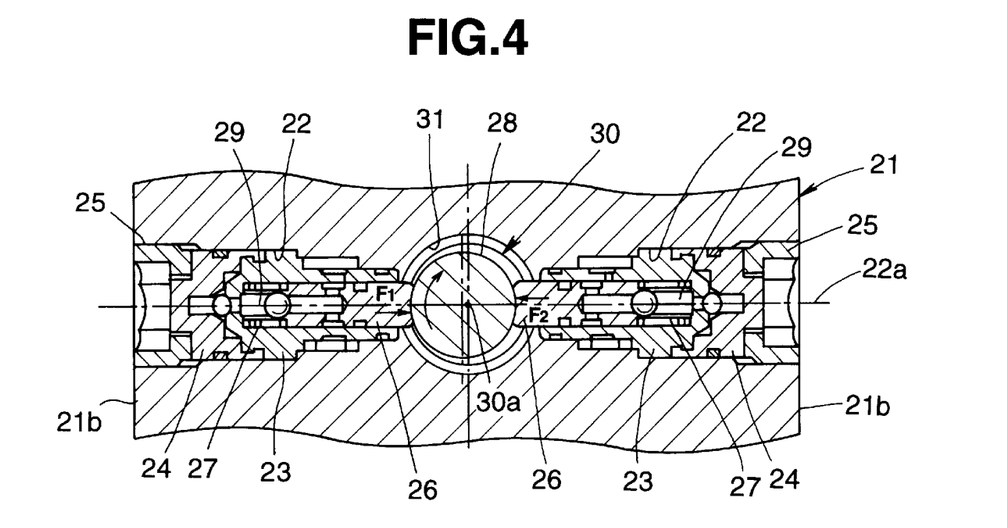
FIG. 4 is a cross-sectional view taken along the line S4–S4 shown in FIG. 2.
Figure 5:
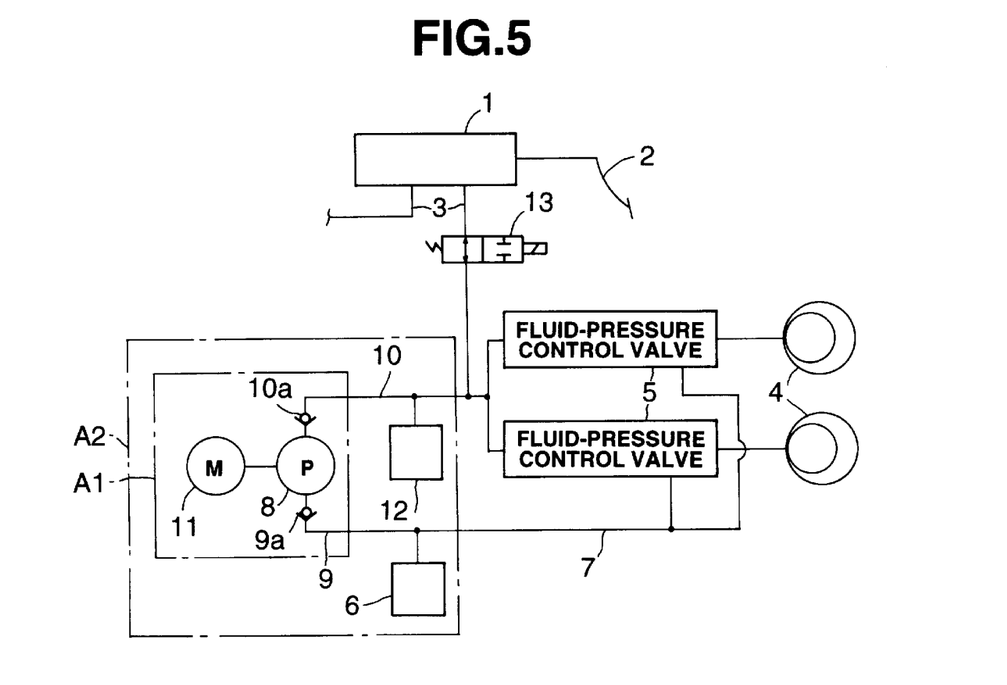
FIG. 5 is a general view corresponding to a block system diagram showing the brake system of the embodiment.

FIGS. 1 through 5 show the brake system of the first embodiment. FIG. 1 shows the front view of the brake unit, FIG. 2 shows the side view of the brake unit, FIG. 3 shows the plan view of the brake unit, FIG. 4 shows the cross section of the brake unit (the cross-sectional view taken along the line S4—S4 of FIG. 2), and FIG. 5 shows the circuit diagram of the hydraulic brake system.

First of all, the whole construction of the brake system is hereunder described in brief by reference to FIG. 5. The brake system is designed to be executable a skid control or an ABS control. Reference sign 1 shown in the drawing denotes a master cylinder capable of generating a brake fluid pressure when depressing a brake pedal 2 by a driver. The master cylinder 1 is connected through a brake circuit 3 to wheel cylinders 4. 4 serving as a brake actuating section (in the drawing, only two wheel-brake cylinders are shown, and the other two wheel-brake cylinder, connected to the brake circuit 3, are omitted for the purpose of illustrative simplicity). Additionally, fluid-pressure control valves 5 are disposed in the middle of the brake/circuit 3, for reducing, holding, and building-up the brake fluid pressure of the brake fluid in the wheel-brake cylinder 4. A drain circuit 7 is connected to each of the fluid-pressure control valves 5, for exhausting the brake fluid into a reservoir 6 during the pressure-reduction operating mode. A suction circuit 9 for a pump 8 is connected to the reservoir 6, whereas a discharge circuit 10 for the pump 8 is connected to a line closer to the master cylinder side (which will be hereinafter referred to as an "upstream side") rather than the fluid-pressure control valve 5 of the brake circuit 3. When the pump 8 is driven according to rotation of a motor 11, the brake fluid in the reservoir 6 is returned to the brake circuit 3.

The discharge circuit 10 is employed with a damper 12 for absorbing pulsation of the fluid discharged from the pump 8. A suction valve 9a and a discharge valve 10a are respectively disposed in the suction circuit 9 and the discharge circuit 10 for the purpose of prevention of back flow.

A normally-open type gate valve 13 is also disposed upstream of a connected point of the discharge circuit 10 to the brake circuit 3, so that the gate valve is closed during the operation of the ABS.

In the shown embodiment, the master cylinder 1 is exemplified as the fluid-pressure generating means. In short, the fluid-pressure generating means corresponds to a means for generating a brake-fluid pressure depending on the braking action of the driver. Alternatively, the braking action may be electrically detected. The fluid-pressure generating means may be replaced by a means producing the fluid pressure created by the fluid-pressure source, on the basis of the detected value, by way of electronic control.

In the system block diagram shown in FIG. 5, the block surrounded by the one-dotted line A1 is included in a brake unit of the brake system to which the concept of the present invention shown in FIGS. 1 though 4 is applied.

In FIGS. 1 through 4, reference sign 21 denotes a housing. Two pump bores 22, 22 are bored, on the same axial line, in the housing 21, so that ends of the pump bores open the respective side walls 21b, 21b (see FIG. 4). In the drawing, reference sign 22a denotes the pump axis corresponding to the axial line of the pump bore. A cylinder 23 and a cap 24 are inserted into each of the pump bores 22, in that order. In addition, The above-mentioned cap 24 and the cylinder 23 are fixed in place by screwing the nut 25 into the opening end of the pump bore 22.

A plunger 26 is accommodated in the above-mentioned cylinder 23. The plunger 26 is urged by means of a spring 27 in a direction that the plunger is projected from the cylinder 23. The tip end of each of the plungers 26 is brought into abutted-engagement with the cam profile 28. Therefore, each of the plungers 26 reciprocates along the axial line of the pump axis 22a in accordance with rotation of the cam profile 28, for sucking the brake fluid into a pressure chamber 29, and then discharging the pressurized brake fluid.

The previously-noted cam profile 28 is formed on the outer periphery of a motor shaft 30 corresponding to a rotational shaft of the motor 11. That is to say, the above-mentioned motor shaft 30 is inserted into an inboard drive-shaft hole 31 which is located between the two pump bores 22 and bored in the housing 11 in a direction perpendicular to the two pump bores 22. In the drawing, reference sign 30a denotes the center of axis of rotation corresponding to the center of axis of the motor shaft.

Furthermore, two flanged portions 11b, 11b are formed at the end of the cover 11a of the motor 11 in such a manner as to be point-symmetrical with respect to the center of the axis of rotation. Mounting bolts 32 are penetrated through the flanged portions 11b, and then screwed into the respective screw-threaded hole 33 which open at one side face (which will be hereinafter referred to as a "front face 21a") of the housing 21 and are threadably formed in the housing 21, with the result that the motor 11 is located at and fixed to the front face 21a of the housing 21. The previously-noted screw-threaded hole 33 is arranged substantially parallel to the center of axis of rotation, and located at a position close to the pump bore 22, but not overlapped with the pump bore under a condition where the screw-threaded hole is projected in the axial direction. As seen in FIG. 1, the two mounting bolts 32 are located to be point-symmetrical with respect to the center 30a of axis of rotation, and also the two screw-threaded holes 33 are located to be point-symmetrical with respect to the center of axis of rotation. And yet, the line a passing through both the center-of-axis 33a of the screw-threaded hole is provided on a line (θ=20°) inclined by an inclined angle of 20° from the pump axis 22a. As shown in FIG. 2, the depth of the screw-threaded hole 33 is formed into such a depth that the bottom end of the screw-threaded hole may reach the pump bore 22 if the screw-threaded hole 33 is provided on the pump axis 22a.

In the drawing, reference signs 34, 34 denote mount insulators required for mounting the housing 21 on the vehicle body, when installing the housing on the vehicle body.

Hereunder described is the operation of the system of the embodiment.

When the motor 11 is driven and the motor shaft 30 rotates, the reciprocating motion of each of the plungers 26, 26 take place, and whereby the sucking and discharging operation of the brake fluid are made. At this time, the reaction forces F1, F2 (see FIG. 4) to the fluid pressure, act against the plungers 26, 26 in the axial direction. Additionally, the reaction forces F1, F2 are transmitted from the plungers 26 into the motor shaft 30 in the direction perpendicular to the motor shaft. The, the reaction forces F1, F2 input into the motor shaft 30 are supported finally by means of the mounting bolts 32, 32.

As previously-discussed, in the first embodiment, the mounting bolts 32 and the screw-threaded holes 33 are both are arranged to be point-symmetrical with respect to the center 30a of axis of rotation, and also the center-of-axis 33a is arranged in such a manner as to be inclined by only 20° with respect to the pump axis 22a. The screw-threaded hole 33 is thus located to be close to the pump bore 22 in the projected direction of the screw-threaded hole. This assures a high rigidity of supporting the motor.

That is to say, as the fixed points of the mounting bolts 32 and the screw-threaded holes 33 are gradually shifted apart from the pump axis 22a, the moment created by the reaction forces F1, F2 acting on the previously-noted plungers 26 becomes greater. Assuming that the fixed points are arranged in such a manner as not to be point-symmetrical with respect to the center 30a of axis of rotation, the moment acting on the fixed points owing to the input force to the motor shaft 30, tends to become greater. In the present embodiment, the fixed points are symmetrical each other with respect to the center 30a of axis of rotation, and additionally located at the location sufficiently close to the pump axis 22a, thus ensuring a high rigidity of support.

Also, in the first embodiment, as discussed above, in order to enhance the rigidity of support, the screw-threaded holes 33 are arranged close to the pump bore 22 in their projected positions, so that the screw-threaded holes do not overlap with the pump axis 22a and the pump bore 22 in the projected positions. It is possible to reduce the thickness of the housing 21 (to reduce the dimension B shown in FIG. 2), in comparison with a case where the screw-threaded hole 33 is located in a manner so as to overlap with the pump axis 22a. This allows the housing 21 to form more compactly. That is to say, assuming that the thickness of the housing 21 retained at the same dimension as that of the first embodiment in the case that the screw-threaded hole 33 is located to overlap with the pump bore 22, the screw-threaded hole 33 may penetrate through the pump bore 22. In this case, there is the need for locating the pump bore 22 considerably apart from the front face 21a of the housing 21 (that is, the need for increasing the dimension B shown in FIG. 2). This increases the thickness of the housing 21, thus large-sizing the housing 21.

As explained above, the system of the first embodiment has an effect that it is possible to reconcile the enhanced rigidity of supporting the motor 11 against the reaction forces F1, F2 to the fluid pressure acting on the plungers 26, and the compactly-sized system arisen from the thin-walled housing 21.

Second Embodiment

Hereinafter described is the brake system of the second embodiment. In explaining the second embodiment, for the purpose of simplification of the disclosure, the same reference signs used to designate elements in the first embodiment will be applied to the corresponding elements used in the second embodiment, while detailed description of the same reference signs will be omitted because the above description thereon seems to be self-explanatory.

Figure 8:
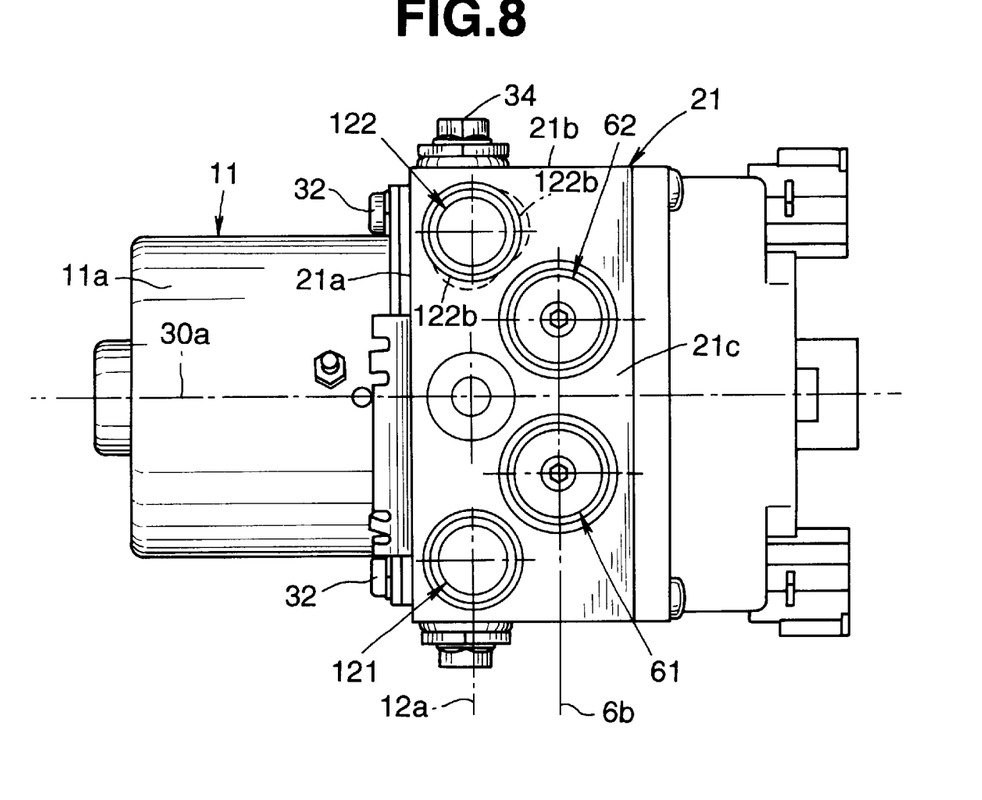
FIG. 8 is a bottom view illustrating the previously-noted brake unit.

In the system block diagram shown in FIG. 5, the component parts surrounded by the one-dotted line A2 are employed in a brake unit of the second embodiment shown in FIGS. 6 through 9. In the second embodiment, the reservoir 6 and the damper 12 are further added to the construction of the first embodiment. That is to say, a first group of a first reservoir 61 and a first damper 121, and a second group of a second reservoir 62 and a second damper 122 are provided in the housing 21 of the second embodiment, so that the first and second groups are respectively associated with the two plungers 26 (not shown in FIGS. 6–9)(the two reservoirs are the two dampers are elements different from that of the first embodiment, and thus reference signs different from FIG. 5 are used to indicate these different elements). Both the dampers 121 and 122 and the reservoirs 61 and 62 are disposed in the damper holes 121a and 122a and the reservoir holes (not shown) respectively opening in the bottom face 21c of the housing 21. Additionally, as seen in FIG. 8, the line 12a passing through both the center of axis of the damper 121 and the center of axis of the damper 122 and the line 6b passing through both the center of axis of the reservoir 61 and the center of axis of the reservoir 62 are arranged to be slightly offset from each other in the direction of the center 30a of axis of rotation of the motor 11. Thus, the thickness of the housing 21 (the dimension in the direction of the center-of-axis 30a of rotation) can be reduced.

Also in the second embodiment, the machined positions of the screw-threaded holes 33 and the mounting bolts 32 are designed to be equal to those of the first embodiment.

Then, in the second embodiment, the shape of the damper hole 121a associated with the first damper 121 is different from the shape of the damper hole 122a of the second damper 122. That is to say, the opening ends of both the damper holes 121a and 122a are formed into the same diameter. Assuming that the damper holes 121a and 122a are formed into the same diameter over their entire length in order to ensure the required volumetric capacity, the entire axial length of both damper holes becomes equal to the axial dimension of the damper hole 121a of the first damper 121. However, if the damper hole 122a of the second damper 122 is formed into the same shape of that of the first damper 121, there is no space necessary to form the screw-threaded hole 33 shown in the right-hand of FIG. 6, that is, the screw-threaded hole 33 being located in a manner so as to be sandwiched between the pump axis 22a and the second damper 122.

Figure 6:
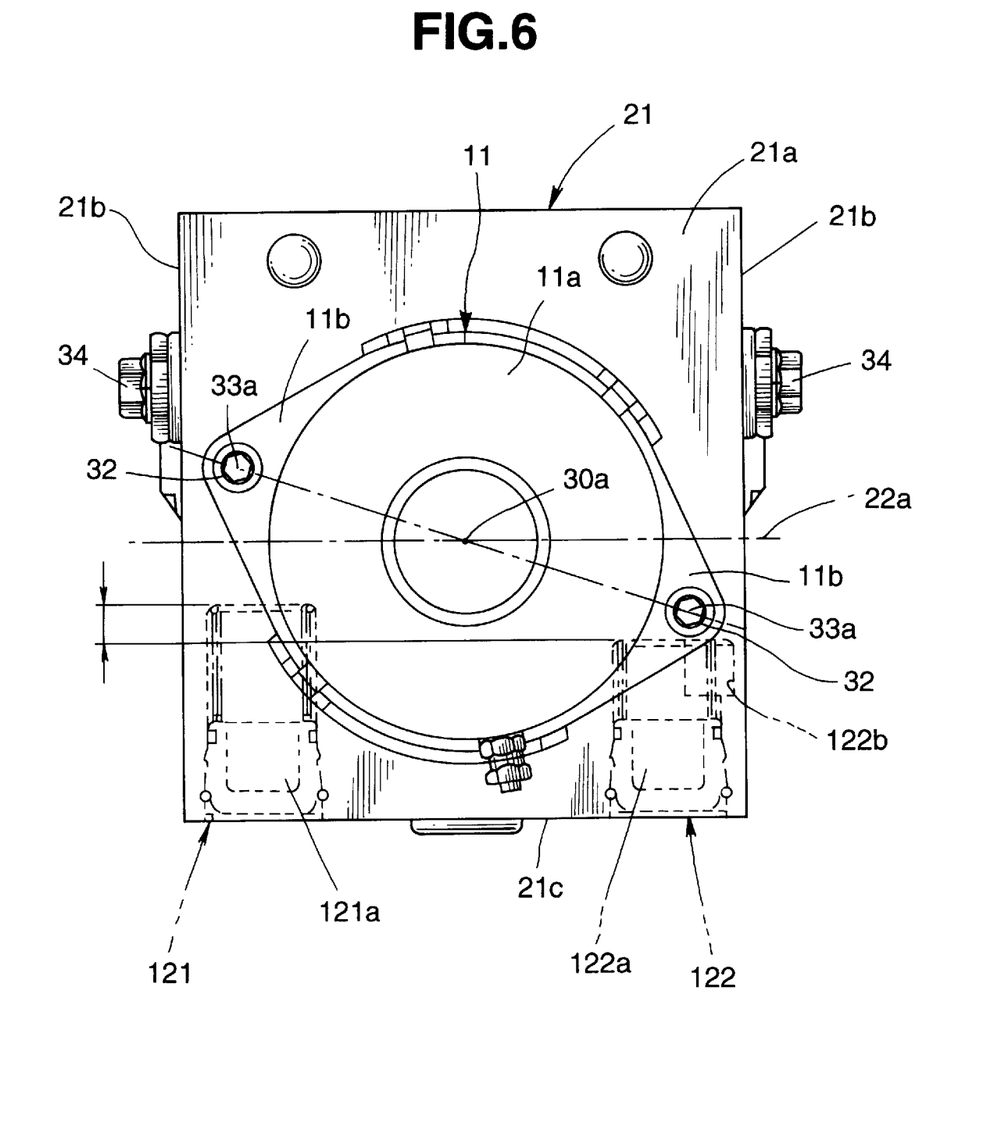
FIG. 6 is a front view illustrating a second embodiment of a brake unit employed in a brake system made according to the invention.
Figure 7:
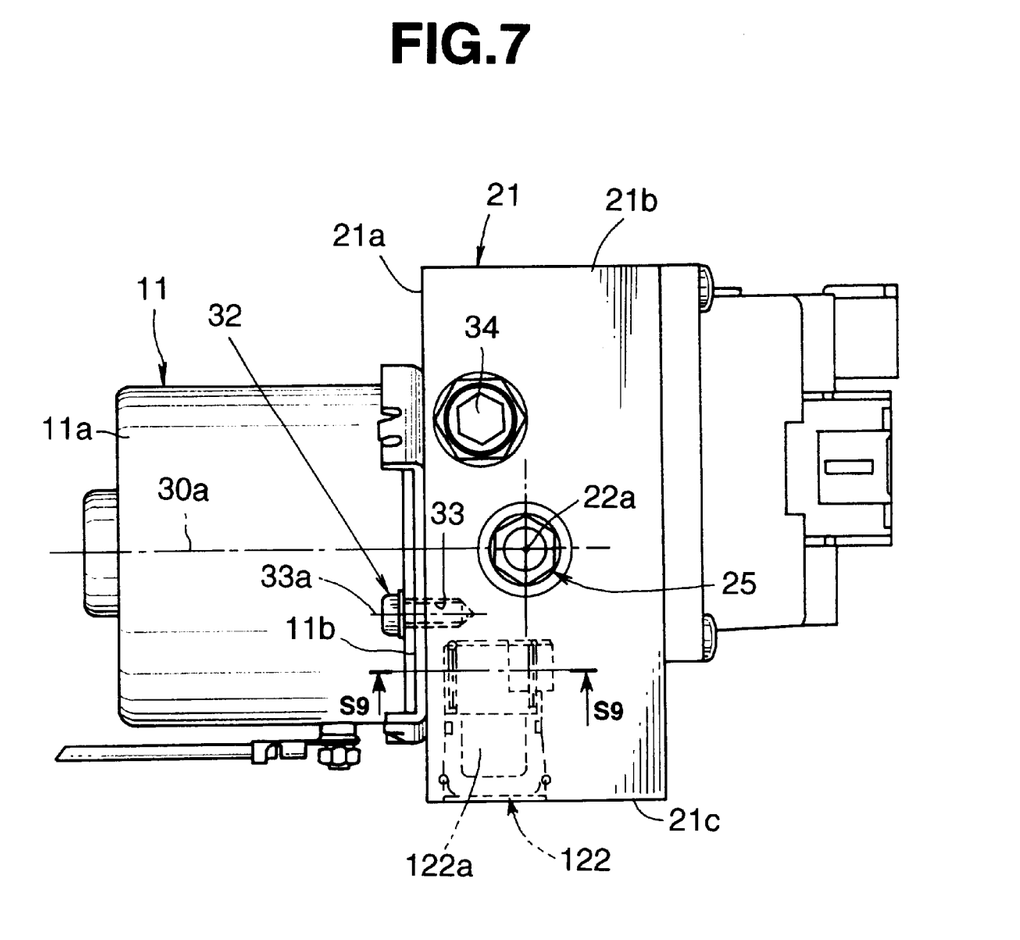
FIG. 7 is a side view illustrating the previously-noted brake unit.
Figure 9:
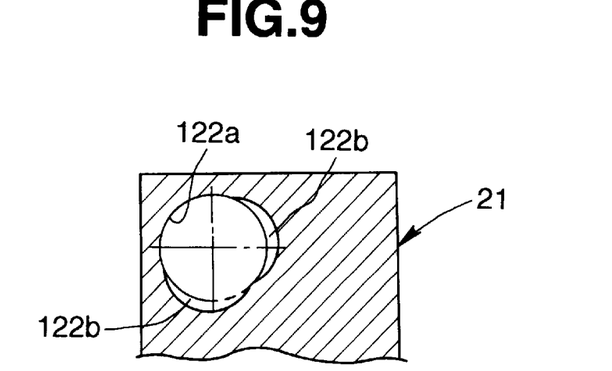
FIG. 9 is a cross-sectional view taken along the line S9—S9 shown in FIG. 7.

For the reasons set forth above, the entire length of the second damper 122 is designed so that the damper hole 122a does not reach the screw-threaded hole 33. As seen in FIGS. 6, 8 and 9 (corresponding to the cross section taken along the line S9—S9 of FIG. 7), enlarged portions 122b are provided at two places in the side wall of the damper hole 122a, so that the whole volumetric capacity of the damper hole of the second damper is identical to that of the damper hole 121a of the first damper 121.

Since the system of the second embodiment is constructed as described above, the second embodiment produces the following effects in addition to the effects of the first embodiment.

In the second embodiment, the screw-threaded holes 33 into which the mounting bolts 33 necessary to mount the cover 11a of the motor 11 are screwed, are arranged to be point-symmetrical with respect to the center-of-axis 30a of rotation. In ensuring the space enough to form the screw-threaded hole between the pump bore 22 of the housing 21 and the second damper 122a in order to produce a high rigidity of supporting the motor when the reaction force to fluid pressure is input from the plungers 26 to the motor shaft 30, it is possible to assure the same volumetric capacity of the first damper 121 having a relatively long entire length by providing the enlarged portions 122b enlarged in the diametrical direction, while suppressing the entire length of the damper hole 122a of the second damper 122 to a shorter value. Therefore, the second embodiment can produce an effect that it is possible to provide the desired damper performance while compactly small-sizing the housing 21 by reducing the up-and-down dimension thereof in FIG. 6.

Additionally, in the second embodiment, since the line 6b connecting both the reservoirs 61 and 62 and the line 12a connecting both the dampers 121 and 122 are arranged to be offset from each other. This reduces the dimension of the housing 21 in the direction-of-axis 30a of rotation, thus producing the effect of compactly-sized housing. It will be understood that the invention is not limited to the particular embodiments shown and described herein. But, although the pump bore is exemplified as the object limiting the layout of the screw-threaded hole 33 of the first embodiment, in lieu thereof, the reservoir hole and/or the damper hole may be regarded as the object. Alternatively, all of the pump bore, the reservoir hole, and the damper hole may be regarded as the object.

As explained above, the brake system of the invention is designed or constructed so that the screw-threaded hole overlap with the pump bore to such an extent that the screw-threaded hole does not overlap with the center of axis of the pump bore when the screw-threaded hole is projected in the direction of the center-of-axis, or so that the screw-threaded hole is located at a position close to the pump bore, thus reconciling the supporting of the motor with a high rigidity when the reaction forces to the fluid pressure acting on the plungers are transmitted to the motor, and the provision of the compactly-sized system arisen from the housing small-sized by reducing the thickness measured from the end face of the housing to the pump bore.

Furthermore, the mounting bolts and the screw-threaded holes are arranged with respect to the center of axis of rotation of the motor, and thus the moment about the fixed point of the motor is scarcely produced. This ensures a more enhanced rigidity of supporting.

Moreover, the line connecting the axes of the mounting bolts or the screw-threaded holes and the axial line are arranged to be angularly offset from each other by 20°. Thus, the moment created at the fixed point of the motor is scarcely produced, thus ensuring a more enhanced rigidity at a supporting point.

In forming one of the two screw-threaded holes midway between the pump bore and the second damper hole, and in ensuring a space enough to form the screw-threaded hole, the small-sizing of the housing can be attained by shortening the axial dimension of the second damper hole, and additionally the damper performance can be ensured by forming the volumetric capacity of the second damper hole into substantially the same volumetric capacity as the first damper hole by way of the provision of the enlarged portions in the second damper hole in its diametrical direction. Thereby, the system can be small-sized without lowering the damper performance.

In addition to the ABS control unit, the invention is widely applicable to a brake system such as a traction control unit by means of which wheel-slip can be controlled during rapid acceleration, a control unit that can control a yawing rate, or the like.

What is claimed is:

1. A brake system comprising:
   a fluid-pressure generating means for generating a brake fluid pressure in response to a demand for braking;
   a brake actuating section connected to the fluid-pressure generating means through a brake circuit;
   a fluid-pressure control means disposed in the brake circuit, for selectively reducing, holding, and building up the brake-fluid pressure of brake fluid in the braking-force actuating section;
   a reservoir fluidly communicated with a drain circuit into which the brake fluid is exhausted by the fluid-pressure control means during a pressure-reduction operating mode;
   a housing including a pump which inducts the brake fluid from the reservoir and discharges pressurized brake fluid into the brake circuit, the pump including:
   a motor which acts as a driving source of the pump;
   a motor driven shaft having a cam profile disposed in an drive-shaft hole formed in said housing;
   coaxial pump bores formed in said housing, said pump bores being perpendicular to the motor driven shaft and located on either side of the cam profile;
   plungers disposed in the pump bores, said plungers having inboard ends thereof in operative engagement with the cam profile so as to reciprocate in response to rotation of the motor driven shaft; and wherein said housing further comprises:
   a reservoir hole in which said reservoir is housed;
   mounting bolts which secure said motor to an end face of said housing; and
   screw-threaded holes into which said mounting bolts are screwed, said screw-threaded holes being arranged substantially parallel to the motor driven shaft and located at positions close to at least one of the pump bore and the reservoir hole so that an extrapolation of the screw-threaded holes in the direction of the screw threaded holes, is non-intersective with neither the pump bore nor the reservoir hole.

2. A brake system comprising:
   a fluid-pressure generating means for generating a brake fluid pressure in response to a demand for braking action;
   a brake actuating section connected to the fluid-pressure generating means through a brake circuit, for applying a braking force to a road wheel;

a fluid-pressure control means disposed in a middle of the brake circuit, for selectively reducing, holding, and building up the brake-fluid pressure of brake fluid in the braking-force actuating section;

a reservoir disposed in a drain circuit into which the brake fluid is exhausted by the fluid-pressure control means during a pressure-reduction operating mode;

a pump inducting the brake fluid in the reservoir and discharging pressurized brake fluid into the brake circuit;

a motor driving the pump;

a motor shaft inserted into a drive-shaft hole formed in a housing, said motor shaft being formed with a cam profile on an outer periphery thereof;

pump bores forming part of the pump and coaxially arranged symmetrically on either side of the cam profile;

plungers whose ends are in abutted-engagement with the cam profile, said plungers being respectively accommodated in the pump bores so that the plungers reciprocate according to rotation of the motor shaft;

said motor being fixed to an end face of the housing by screwing mounting bolts into screw-threaded holes formed in the housing;

the screw-threaded holes being arranged substantially parrallelly in an axial direction of said motor shaft;

the screw-threaded holes being located at positions close to at least one of the pump bore and a damper hole formed in the housing so that the pump bore and the damper hole are non-intersective with axial extrapolations of the screw-threaded holes.

3. A brake system comprising:

a fluid-pressure generating means for generating a brake fluid pressure depending on a driver's braking action;

a brake actuating section connected to the fluid-pressure generating means through a brake circuit, for applying a braking force to a road wheel;

a fluid-pressure control means disposed in a middle of the brake circuit, for reducing, holding, and building up the brake-fluid pressure of brake fluid in the braking-force actuating section;

a reservoir disposed in a drain circuit into which the brake fluid is exhausted by the fluid-pressure control means during a pressure-reduction operating mode;

a pump sucking the brake fluid in the reservoir and discharging the brake fluid into the brake circuit;

a motor being a driving source of the pump;

a motor shaft inserted into an inboard drive-shaft hole formed in a housing, and formed on an outer periphery thereof with a cam profile;

pump bores constructing part of the pump and arranged symmetrically on a same axial line perpendicular to the motor shaft in a manner so as to sandwich the cam profile therebetween;

plungers whose ends are in abutted-engagement with the cam profile, and said plungers respectively accommodated in the pump bores so that the plungers reciprocate according to rotation of the motor shaft;

said motor being fixed to an end face of the housing by screwing mounting bolts into screw-threaded holes formed in the housing; and the screw-threaded holes being arranged substantially parrallelly in an axial direction of said motor shaft;

wherein the screw-threaded holes are located at positions close to the pump bore, a reservoir hole for the reservoir, or a damper hole formed in the housing to such an extent that the pump bore, the reservoir hole, and the damper hole do not overlap with respect to the screw-threaded holes when the pump bore, the reservoir hole, and the damper hole are projected in axial directions of the screw-threaded holes.

4. A brake system comprising:

a fluid-pressure generating means for generating a brake fluid pressure in response to a demand for braking;

a brake actuating section connected to the fluid-pressure generating means through a brake circuit, for applying a braking force to a road wheel;

a fluid-pressure control means disposed in the brake circuit, for selectively reducing, holding, and building up the brake-fluid pressure of brake fluid in the braking-force actuating section;

a reservoir disposed in a drain circuit into which the brake fluid is exhausted by the fluid-pressure control means during a pressure-reduction operating mode;

a pump inducting the brake fluid in the reservoir and discharging the brake fluid into the brake circuit;

a motor driving the pump;

a motor shaft inserted into an drive-shaft hole formed in a housing, and formed on an outer periphery thereof with a cam profile;

pump bores constructing part of the pump and arranged symmetrically on a common axial line perpendicular to the motor shaft in a manner so as to interpose the cam profile therebetween;

plungers whose ends are in operative engagement with the cam profile, said plungers being respectively accommodated in the pump bores so that the plungers reciprocate according to rotation of the motor shaft;

said motor being fixed to an end face of the housing by screwing mounting bolts into screw-threaded holes formed in the housing;

the screw-threaded holes being arranged substantially parrallelly in an axial direction of said motor shaft;

the screw-threaded holes being located at positions close to the pump bore to such an extent that the screw-threaded holes and the pump bore are non-intersective and an extrapolation of the screw-threaded holes do not overlap each other when the pump bore is projected in axial directions of the screw-threaded holes, and the mounting bolts being secured to two points which are point-symmetrical with respect to a center of axis of rotation of said motor shaft, and the screw-threaded holes being formed at the two points being point-symmetrical with respect to the center of axis of rotation, and the screw-threaded holes being arranged so that a line connecting axes of the mounting bolts and a line connecting axes of the screw-threaded holes which are respectively intersective with a pump bore axis are inclined at a predetermined angle with respect to one another.

5. The brake system as claimed in claim 4, wherein the predetermined angle is 20°.

6. A brake system comprising:

a fluid-pressure generating means for generating a brake fluid pressure in response to a demand for braking;

a brake actuating section connected to the fluid-pressure generating means through a brake circuit, for applying a braking force to a road wheel;

a fluid-pressure control means disposed in the brake circuit, for selectively reducing, holding, and building up the brake-fluid pressure of brake fluid in the braking-force actuating section;

a reservoir disposed in a drain circuit into which the brake fluid is exhausted by the fluid-pressure control means during a pressure-reduction operating mode;

a pump inducting the brake fluid in the reservoir and discharging the brake fluid into the brake circuit;

a motor driving the pump;

a motor shaft inserted into an drive-shaft hole formed in a housing, and formed on an outer periphery thereof with a cam profile;

pump bores constructing part of the pump and arranged symmetrically on a common axial line perpendicular to the motor shaft in a manner so as to interpose the cam profile therebetween;

plungers whose ends are in operative engagement with the cam profile, said plungers being respectively accommodated in the pump bores so that the plungers reciprocate according to rotation of the motor shaft;

said motor being fixed to an end face of the housing by screwing mounting bolts into screw-threaded holes formed in the housing;

the screw-threaded holes being arranged substantially parrallelly in an axial direction of said motor shaft, and formed in a direction substantially perpendicular to an axis of the pump bore;

the screw-threaded holes being located at positions close to the pump bore to such an extent that the screw-threaded holes and the pump bore do not overlap each other when the pump bore is projected in axial directions of the screw-threaded holes, and said plungers comprising two plungers disposed in the housing and said pump bores comprising two pump bores disposed in the housing, and a first reservoir and a first damper, both associated with a first plunger of the plungers, being provided in the housing, and a second reservoir and a second damper, both associated with a second plunger of the plungers, being provided in the housing, both of the reservoirs being disposed in first and second reservoir holes and both of the dampers being disposed in first and second damper holes, the first and second reservoir holes and the first and second damper holes being bored from a face perpendicular to all a face of the housing onto which the motor is fixedly connected and faces through which the pump bores open, and bored in a direction perpendicular to both the axis of the pump bore and the motor shaft, and the two reservoir holes and the two damper holes being arranged so that a line connecting axes of the reservoir holes and a line connecting the damper holes do not overlap each other, and one of the damper holes being arranged at a position where said one of the damper holes overlaps the pump bore when the pump bore is projected in an axial direction of said one of the damper holes, and when viewing the two screw-threaded holes from the face onto which the motor is mounted, one of the screw-threaded holes being arranged in the opposite side of the first damper hole overlapping the pump bore in a projected direction, while sandwiching the pump bore in cooperation with said one of the screw-threaded holes, whereas another screw-threaded hole of the two screw-threaded holes being disposed between the pump bore and the second damper hole, and that diameters of openings of both of the damper holes being formed to be identical to each other, an axial dimension of the second damper hole being formed to be shorter than an axial dimension of the first damper hole, and the second damper hole being formed, at a side wall thereof with an enlarged portion provided to enlarge a volumetric capacity of the second damper hole in a diametrical direction, so that the volumetric capacities of both of the damper holes are substantially identical to each other.

7. A brake system comprising:

a fluid-pressure generating means for selectively generating a brake fluid pressure in response to a demand for vehicular braking;

a brake actuating section connected to the fluid-pressure generating means through a brake circuit;

a fluid-pressure control means disposed in the brake circuit for reducing, selectively holding, and building up the brake-fluid pressure of brake fluid in the braking-force actuating section;

a reservoir disposed in a drain circuit into which the brake fluid is exhausted by the fluid-pressure control means during a pressure-reduction operating mode;

a pump which inducts brake fluid from the reservoir discharges pressurized brake fluid into the brake circuit;

a motor driving the pump;

a drive shaft disposed in a hole formed in a housing, said shaft having a cam profile formed thereon;

coaxially aligned pump bores which form part of said pump and which are arranged on opposite sides of the cam profile;

plungers reciprocatively disposed in the said pump bores, said plungers having ends in operative engagement with the cam profile;

said motor being fixed to an end face of the housing by screwing mounting bolts into screw-threaded holes formed in the housing;

the screw-threaded holes being arranged substantially parallel to said motor shaft and located at positions close to at least one of a damper hole formed in the housing and a reservoir hole for said reservoir to such an extent that the damper hole and the reservoir hole are not intersected by extrapolations of the screw-threaded holes.

8. A brake system comprising:

a fluid-pressure generating means for selectively generating a brake fluid pressure upon a demand for vehicular braking;

a brake actuating section connected to the fluid-pressure generating means through a brake circuit, for applying a braking force to a road wheel;

a fluid-pressure control means disposed in the brake circuit, for reducing, holding, and building up the brake-fluid pressure of brake fluid in the braking-force actuating section;

a reservoir disposed in a drain circuit into which the brake fluid is exhausted by the fluid-pressure control means during a pressure-reduction operating mode;

a pump which takes brake fluid from the reservoir and discharges it into the brake circuit, the pump having a motor, a motor shaft which extends into a drive-shaft hole formed in a housing, pump bores arranged coaxially on either side of the motor shaft, and plungers reciprocally disposed in the pump bores and disposed so that inboard ends thereof are operatively engageable with a cam profile provided on the motor shaft; and a connection arrangement for connecting said pump to said housing, comprising:

mounting bolts, and screw-threaded holes formed in the housing into which the mounting bolts are screwed, said screw-threaded holes each being arranged substantially parallel to the motor shaft and located at positions close to a pump bore and so that axial extrapolations of the screw-threaded holes are non-intersective with the pump bores, said screw-threaded holes being formed at points which are point-symmetrical with respect to a center of axis of rotation of said motor shaft.

9. The brake system as claimed in claim 8, wherein the screw-threaded holes are arranged so that a first line normally intersects the axes of the mounting bolts and is intersective of an axis of the coaxial pump bores, is inclined by a predetermined angle with respect to the aligned axes of the coaxial pump bores.

10. The brake system as claimed in claim 9, wherein the predetermined angle is approximately 20°.

11. A brake system comprising:

a housing including a pump which inducts the brake fluid from a reservoir and discharges pressurized brake fluid into a brake circuit, the pump including:

a motor which acts as a driving source of the pump, said motor having a motor driven shaft including a cam profile;

a pump bore formed in said housing, said pump bore having a reciprocal plunger disposed therein so as to be operatively engageable with the cam profile;

said housing comprising:

a reservoir cavity housing said reservoir;

mounting bolts which secure said motor to an end face of said housing; and screw-threaded holes into which said mounting bolts are screwed, said screw-threaded holes being arranged substantially parallel to the motor driven shaft and located proximate the pump bore and the reservoir hole so that an extrapolation of the screw-threaded holes in the direction of the screw threaded holes, passes between the pump bore and the reservoir cavity.

* * * * *